Jan. 23, 1962

H. L. DOBRIKIN 3,018,123

CONNECTOR DEVICE

Filed Dec. 1, 1959

INVENTOR.
Harold L. Dobrikin,
BY Parker & Carter
Attorneys.

United States Patent Office 3,018,123
Patented Jan. 23, 1962

3,018,123
CONNECTOR DEVICE
Harold L. Dobrikin, Chicago, Ill., assignor to Berg Airlectro Products Company, Chicago, Ill., a corporation of Illinois
Filed Dec. 1, 1959, Ser. No. 856,406
2 Claims. (Cl. 287—59)

This invention relates to connector devices and has particular relation to connector devices usable with tensioned cables and the like.

One purpose of the invention is to provide a readily disconnectable device usable with a cable element.

Another purpose is to provide a device effective to maintain a cable under tension and to be readily expandable to release said tension.

Another purpose is to provide a cable connector which may be separated to release tension upon said cable while retaining the elements of said connector device secured one to the other.

Another purpose is to provide a cable tension connector which may be expanded to release cable tension with a minimum of effort.

Other purposes will appear from time to time during the course of the specification and claims.

Figure 1:
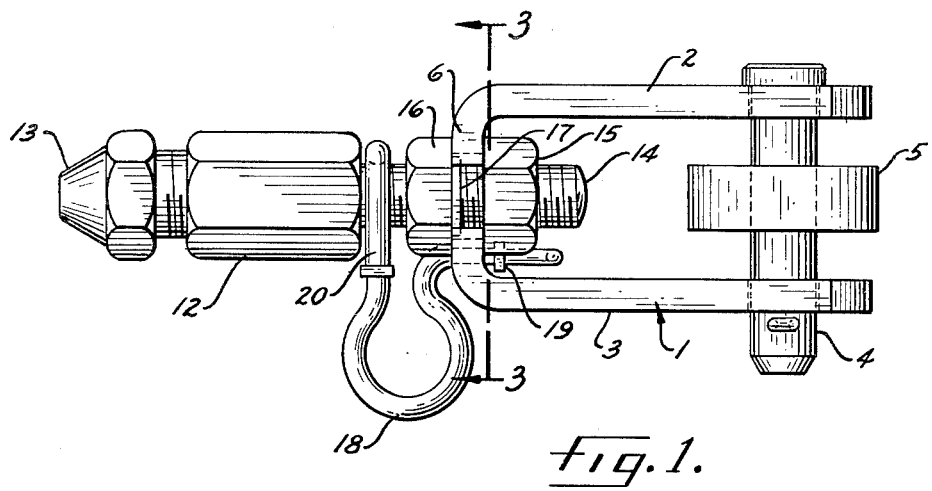
Figure 2:
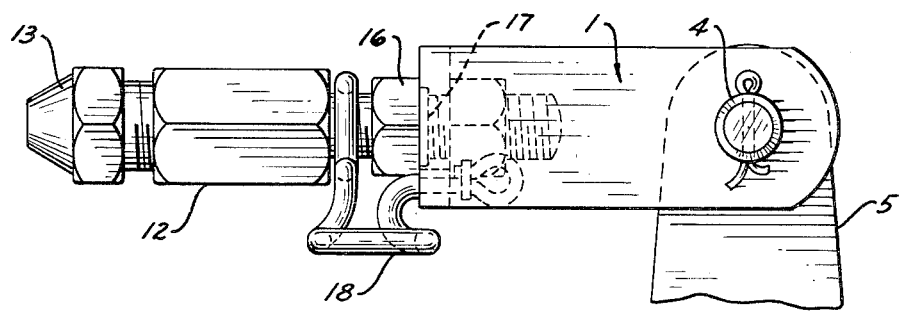
Figure 3:
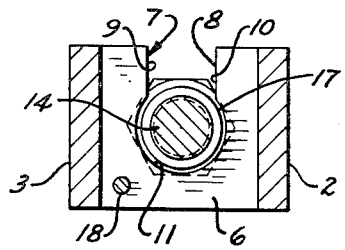

I illustrate my invention more or less diagrammatically in the accompanying drawings, wherein:

FIGURE 1 is a top plan view;
FIGURE 2 is a side elevation; and
FIGURE 3 is a view taken on the line 3—3 of FIGURE 1.

Like parts are indicated by like numerals throughout the specification and drawings.

A U-shaped fitting, generally indicated by the numeral 1, may have the outer ends of its parallel arms 2, 3 apertured to receive a thrust member 4 extending therebetween and rotatably mounted in an arm indicated partially at 5. It will be understood that the arm 5 may be connected to any suitable mechanism to be operated by means of a cable, later discussed. For example, the pneumatic brake system of a tractor-trailer vehicle may incorporate as a part of the operative elements thereof a pivoted arm 5.

The member 1 has its arms 2, 3 joined by a cross portion 6. The portion 6 has a key-shaped slot 7 formed therein. The slot 7 has its open end 8 intersecting one edge of the portion 6 and defined by parallel walls 9, 10. The walls 9, 10 intersect a circular slot portion 11, the diameter of which is greater than the distance between the walls 9, 10. It will be observed that the walls 9, 10 intersect a segment of the circular portion 11 substantially less than half the circumference of the circular portion 11.

A cable-attachment fitting 12 is provided for suitable connections to a cable as by means of the element 13. Extending in the opposite direction from the fitting 12 and element 13 is a threaded shaft 14. The shaft 14 has a pair of securing elements, for example, the nuts 15, 16 threadably mounted thereon. One of the members 15, 16 is provided with an axial extension 17, illustrated herein as mounted upon the member 16. The extension 17 is circular in form and has an outer diameter only slightly less than the diameter of the circular slot portion 11.

A retainer element 18 takes the form of a length of wire or cable, flexible in nature, and extending between the fittings 1 and 12, the member 18 having a length suitable for permitting the desired relaxation of the cable secured to element 13 or, expressed in other words, the member 18 is of a length suitable to permit the amount of expansion desired in the cable system, while retaining the fittings 1, 12 in connected relationship. The member 18 is secured to the fitting 1 as at 19 and is looped about the shaft 14, between the nut element 16 and fitting 12, as indicated at 20.

Whereas I have described and illustrated a practical and operative device, nevertheless, many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:
With the parts shown in attached relationship, as in FIGURE 1, the extension 17 seats within the circular slot portion 11 and the nut elements 15, 16 are drawn up against opposite faces of the fitting portion 6. Tension applied by a cable secured to element 13 is thus transmitted to fitting 1 and through fitting 1 and member 4 to the arm 5. When the operator desires to release tension upon the cable attached to element 13, it is only necessary that the operator rotate member 16 to withdraw it from the adjacent surface of fitting portion 6. So doing removes the extension 17 from the circular slot portion 11. Since the shaft 14 has a diameter less than the distance between the slot walls 9, 10, the shaft 14 may then be lifted or moved through the slot 7 and the fitting 1 is thus separated from fitting 12, shaft 14 and elements 15, 16. The member 18 retains the fittings 1 and 12, the amount of system expansion or cable-tension release corresponding to the length of the member 18.

The connector of my invention is reassembled by a simple return of the shaft 14 through the slot 7 into the circular portion 11 thereof and the turning of member 16 on shaft 14 to center the extension 17 in the circular slot portion 11. The juncture of walls 9 and 10 with the circular portion 11 serve to retain the enlargement 17.

I claim:

1. A quick-disconnect cable connector device comprising a first fitting and a second fitting, a slot in said first fitting, said slot having a pair of parallel walls intersecting an edge of said first fitting and a circular portion intersecting said parallel walls, the diameter of said circular portion being greater than the distance between said parallel walls, said second fitting having a threaded shaft, said threaded shaft having a diameter less than the distance between said parallel walls, a pair of nut elements threadably engaging said shaft on opposite sides of said first fitting and adapted to bear thereagainst, one of said nut elements having a circular extension thereon, said circular extension being positioned within said circular slot portion and having a diameter greater than the distance between said parallel walls, said one nut element adapted to be backed off on said shaft so as to move said circular extension out of said circular slot portion and permit said shaft to be removed from said slot, and a securing means comprising a flexible cable connected to said first fitting and said second fitting and having a normal length greater than the shaft, said flexible cable being coiled upon itself when said fittings are engaged one with the other.

2. A quick-disconnect cable connector comprising a first fitting and a second fitting, said first fitting having a substantially flat portion, a slot formed in said portion, said slot having a pair of parallel walls intersecting an edge of said flat portion, said slot having a circular portion intersecting said parallel walls and having a diameter greater than the distance between said parallel walls, said second fitting having at one of its ends means adapted to attachably receive a flexible cable, a threaded shaft on the opposite end of said second fitting, said shaft having a diameter less than the distance between said parallel walls, a pair of nut elements threadably mounted on said shaft on opposite sides of said first fitting flat portion and adapted to bear thereagainst, one of said nut elements having a circular extension positioned in said circular slot portion and having a diameter greater than the distance between said parallel walls, said one nut element adapted to be backed off on said shaft so as to move said circular extension out of said circular slot portion and permit said shaft to be removed from said slot, and a flexible wire element secured to said threaded shaft between said nut elements and said second fitting and secured to said first fitting, said flexible wire element having a normal length greater than the distance between said fittings, said wire element being coiled upon itself when said fittings are in engagement one with the other.

References Cited in the file of this patent

UNITED STATES PATENTS

| | | |
|---|---|---|
| 523,284 | Johnston | July 17, 1894 |
| 883,220 | Middlebrook | Mar. 31, 1908 |
| 1,291,079 | Morris | Jan. 14, 1919 |
| 1,579,418 | Tomkinson | Apr. 6, 1926 |
| 1,581,109 | Franke | Apr. 20, 1926 |
| 1,903,695 | Chobert | Apr. 11, 1933 |
| 1,903,863 | Hayden | Apr. 18, 1933 |

FOREIGN PATENTS

| | | |
|---|---|---|
| 124,679 | Great Britain | Apr. 3, 1919 |